US010321312B2

(12) United States Patent
Fujita

(10) Patent No.: US 10,321,312 B2
(45) Date of Patent: Jun. 11, 2019

(54) COMMUNICATION APPARATUS AND CONTROL METHOD THEREOF

(71) Applicant: CANON KABUSHIKI KAISHA, Tokyo (JP)

(72) Inventor: Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 15/218,331

(22) Filed: Jul. 25, 2016

(65) Prior Publication Data

US 2017/0048705 A1 Feb. 16, 2017

(30) Foreign Application Priority Data

Aug. 10, 2015 (JP) ................................ 2015-158494

(51) Int. Cl.

*H04W 12/06* (2009.01)
*H04W 48/16* (2009.01)
*H04L 29/06* (2006.01)
*H04W 84/12* (2009.01)

(52) U.S. Cl.

CPC ............. *H04W 12/06* (2013.01); *H04L 63/06* (2013.01); *H04L 63/083* (2013.01); *H04W 48/16* (2013.01); *H04W 84/12* (2013.01)

(58) Field of Classification Search

CPC ..... H04W 12/06; H04W 48/16; H04W 48/18; H04W 36/0077; H04L 63/06; H04L 63/083

See application file for complete search history.

(56) References Cited

U.S. PATENT DOCUMENTS 9,088,760 B2 7/2015 Fujita ..................... H04N 5/765
9,629,071 B2 * 4/2017 Tian .................. H04W 36/0033
2006/0209773 A1 * 9/2006 Hundal ............... H04L 63/0428 370/338
2007/0206527 A1 9/2007 Lo et al. ....................... 370/328

(Continued)

FOREIGN PATENT DOCUMENTS

JP 2011-035768 2/2011

OTHER PUBLICATIONS

Communication from GB Intellectual Property Office in Counterpart Application No. GB 1613611.1, dated Jan. 18, 2017.

*Primary Examiner* — Hee K Song
(74) *Attorney, Agent, or Firm* — Venable LLP

(57) ABSTRACT

A communication apparatus includes a search unit that searches for wireless networks which use a first frequency band and wireless networks which use a second frequency band, an association unit which associates a first wireless network which uses the first frequency band with a second wireless network which uses the second frequency band, the first wireless network and the second wireless network being formed by the same device, a selection unit which selects, a wireless network to connect to, and an authentication unit which performs authentication processing for connecting to the selected wireless network. In a case where the first wireless network is selected, the authentication unit performs control so as to perform authentication processing for connecting to the selected first wireless network before connecting to the selected first wireless network and perform authentication processing for connecting to the second wireless network associated with the first wireless network.

12 Claims, 9 Drawing Sheets

(56) References Cited

U.S. PATENT DOCUMENTS

2012/0144469 A1* 6/2012 Ainslie ................. G06F 3/0481 726/7
2012/0266217 A1* 10/2012 Kaal ................... H04L 63/0407 726/4
2012/0278452 A1* 11/2012 Schmitz .............. H04L 63/0807 709/220
2012/0304297 A1* 11/2012 Chung ................ H04L 63/1416 726/23
2013/0064132 A1* 3/2013 Low ...................... H04W 24/02 370/254
2013/0150012 A1* 6/2013 Chhabra ............... H04W 48/16 455/418
2014/0200030 A1* 7/2014 Barathalwar ......... H04W 4/025 455/456.2
2014/0254577 A1* 9/2014 Wright .................. H04W 12/04 370/338
2014/0362782 A1* 12/2014 Yuk ..................... H04W 72/042 370/329
2015/0029333 A1* 1/2015 Ko ........................ H04W 48/20 348/143
2015/0055505 A1* 2/2015 Lai ........................ H04W 48/14 370/254
2015/0139032 A1* 5/2015 Ko ........................ H04W 48/16 370/254
2016/0037564 A1* 2/2016 Borden ................. H04W 76/10 370/254
2016/0066353 A1* 3/2016 Kumar ................ H04W 76/021 709/227
2016/0073440 A1* 3/2016 Pallen ................... H04W 12/04 370/329
2016/0100352 A1* 4/2016 Yunoki ................. H04W 48/16 370/254
2016/0219469 A1* 7/2016 Rothery, III ...... H04W 36/0077
2016/0227535 A1* 8/2016 Sharma ............. H04W 72/0453
2016/0242025 A1* 8/2016 Aliyar ................... H04W 12/04
2016/0249315 A1* 8/2016 Venkatraman ........ H04W 64/00

* cited by examiner

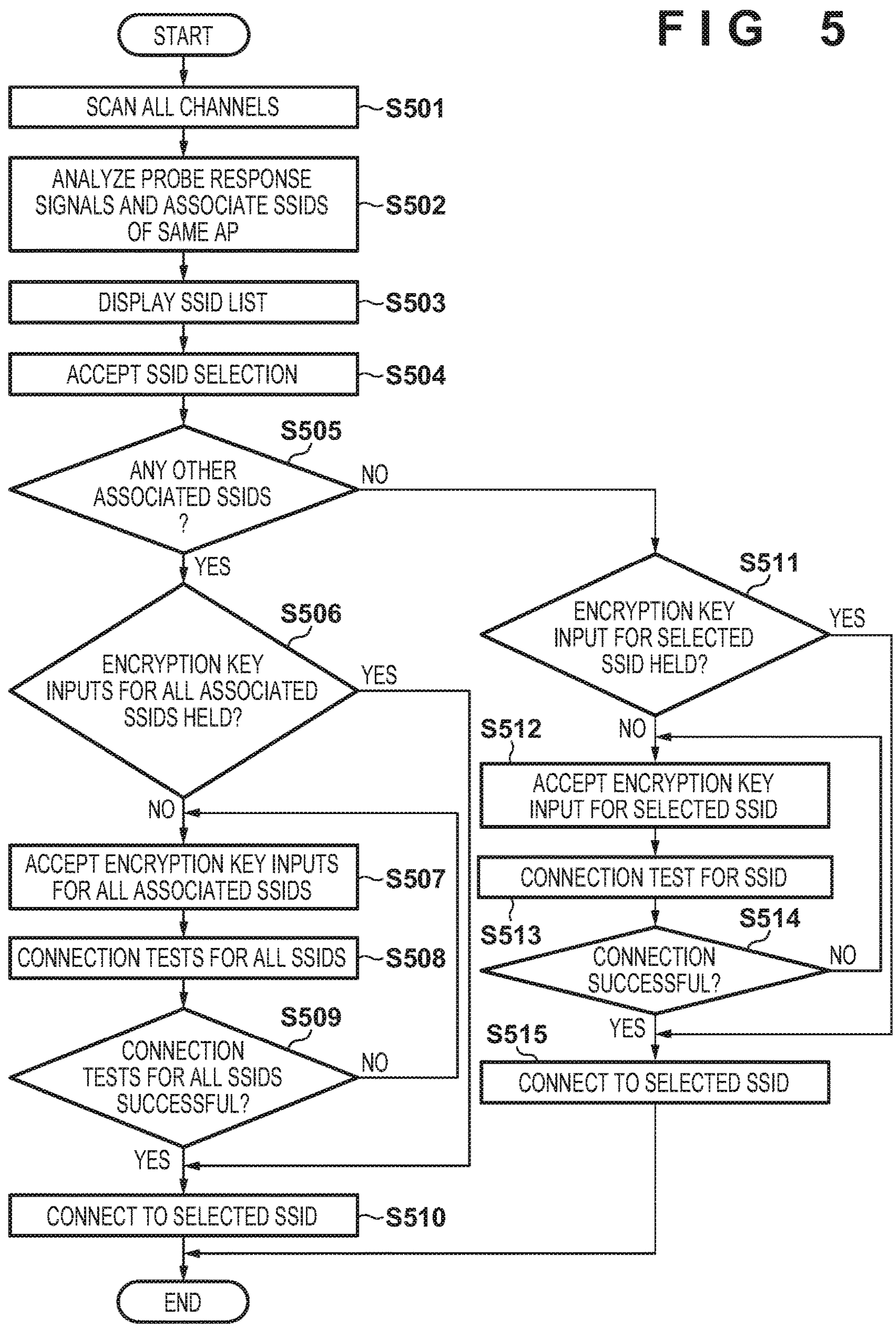
FIG 5
START
SCAN ALL CHANNELS
S501
ANALYZE PROBE RESPONSE SIGNALS AND ASSOCIATE SSIDS OF SAME AP
S502
DISPLAY SSID LIST
S503
ACCEPT SSID SELECTION
S504
S505
ANY OTHER ASSOCIATED SSIDS ?
NO
YES
S506
ENCRYPTION KEY INPUTS FOR ALL ASSOCIATED SSIDS HELD?
YES
NO
ACCEPT ENCRYPTION KEY INPUTS FOR ALL ASSOCIATED SSIDS
S507
CONNECTION TESTS FOR ALL SSIDS
S508
S509
CONNECTION TESTS FOR ALL SSIDS SUCCESSFUL?
NO
YES
CONNECT TO SELECTED SSID
S510
END
S511
ENCRYPTION KEY INPUT FOR SELECTED SSID HELD?
YES
NO
S512
ACCEPT ENCRYPTION KEY INPUT FOR SELECTED SSID
CONNECTION TEST FOR SSID
S513
S514
CONNECTION SUCCESSFUL?
NO
YES
S515
CONNECT TO SELECTED SSID

FIG 6A

| No | ch | BSSID | SSID | UUID |
|---|---|---|---|---|
| 1 | 1 | 22:22:22:22:22:01 | BBBBB | 22222222222222222222222222222222 |
| 2 | 6 | 11:11:11:11:11:02 | AAAAA-g | 11111111111111111111111111111111 |
| 3 | 9 | 44:44:44:44:44:02 | DDDDD_2 | 44444444444444444444444444444444 |
| 4 | 11 | 33:33:33:33:33:01 | CCCCC | 33333333333333333333333333333333 |
| 5 | 40 | 11:11:11:11:11:01 | AAAAA-a | 11111111111111111111111111111111 |
| 6 | 48 | 44:44:44:44:44:01 | DDDDD_1 | 44444444444444444444444444444444 |

| No | ch | BSSID | SSID | UUID | ASSOCIATION No. |
|---|---|---|---|---|---|
| 1 | 1 | 22:22:22:22:22:01 | BBBBB | 22222222222222222222222222222222 | NA |
| 2 | 6 | 11:11:11:11:11:02 | AAAAA-g | 11111111111111111111111111111111 | 5 |
| 3 | 9 | 44:44:44:44:44:02 | DDDDD_2 | 44444444444444444444444444444444 | 6 |
| 4 | 11 | 33:33:33:33:33:01 | CCCCC | 33333333333333333333333333333333 | NA |
| 5 | 40 | 11:11:11:11:11:01 | AAAAA-a | 11111111111111111111111111111111 | 2 |
| 6 | 48 | 44:44:44:44:44:01 | DDDDD_1 | 44444444444444444444444444444444 | 3 |

| No | ch | BSSID | SSID | UUID | WPS OPERATING |
|---|---|---|---|---|---|
| 1 | 1 | 22:22:22:22:22:01 | BBBBB | 22222222222222222222222222222222 | NO |
| 2 | 6 | 11:11:11:11:11:02 | AAAAA-g | 11111111111111111111111111111111 | YES |
| 3 | 9 | 44:44:44:44:44:02 | DDDDD_2 | 44444444444444444444444444444444 | NO |
| 4 | 11 | 33:33:33:33:33:01 | CCCCC | 33333333333333333333333333333333 | NO |
| 5 | 40 | 11:11:11:11:11:01 | AAAAA-a | 11111111111111111111111111111111 | YES |
| 6 | 48 | 44:44:44:44:44:01 | DDDDD_1 | 44444444444444444444444444444444 | NO |

| No | ch | BSSID | SSID | UUID | WPS OPERATING | ASSOCIATION No. |
|---|---|---|---|---|---|---|
| 1 | 1 | 22:22:22:22:22:01 | BBBBB | 22222222222222222222222222222222 | NO | – |
| 2 | 6 | 11:11:11:11:11:02 | AAAAA-g | 11111111111111111111111111111111 | YES | 5 |
| 3 | 9 | 44:44:44:44:44:02 | DDDDD_2 | 44444444444444444444444444444444 | NO | – |
| 4 | 11 | 33:33:33:33:33:01 | CCCCC | 33333333333333333333333333333333 | NO | – |
| 5 | 40 | 11:11:11:11:11:01 | AAAAA-a | 11111111111111111111111111111111 | YES | 2 |
| 6 | 48 | 44:44:44:44:44:01 | DDDDD_1 | 44444444444444444444444444444444 | NO | – |

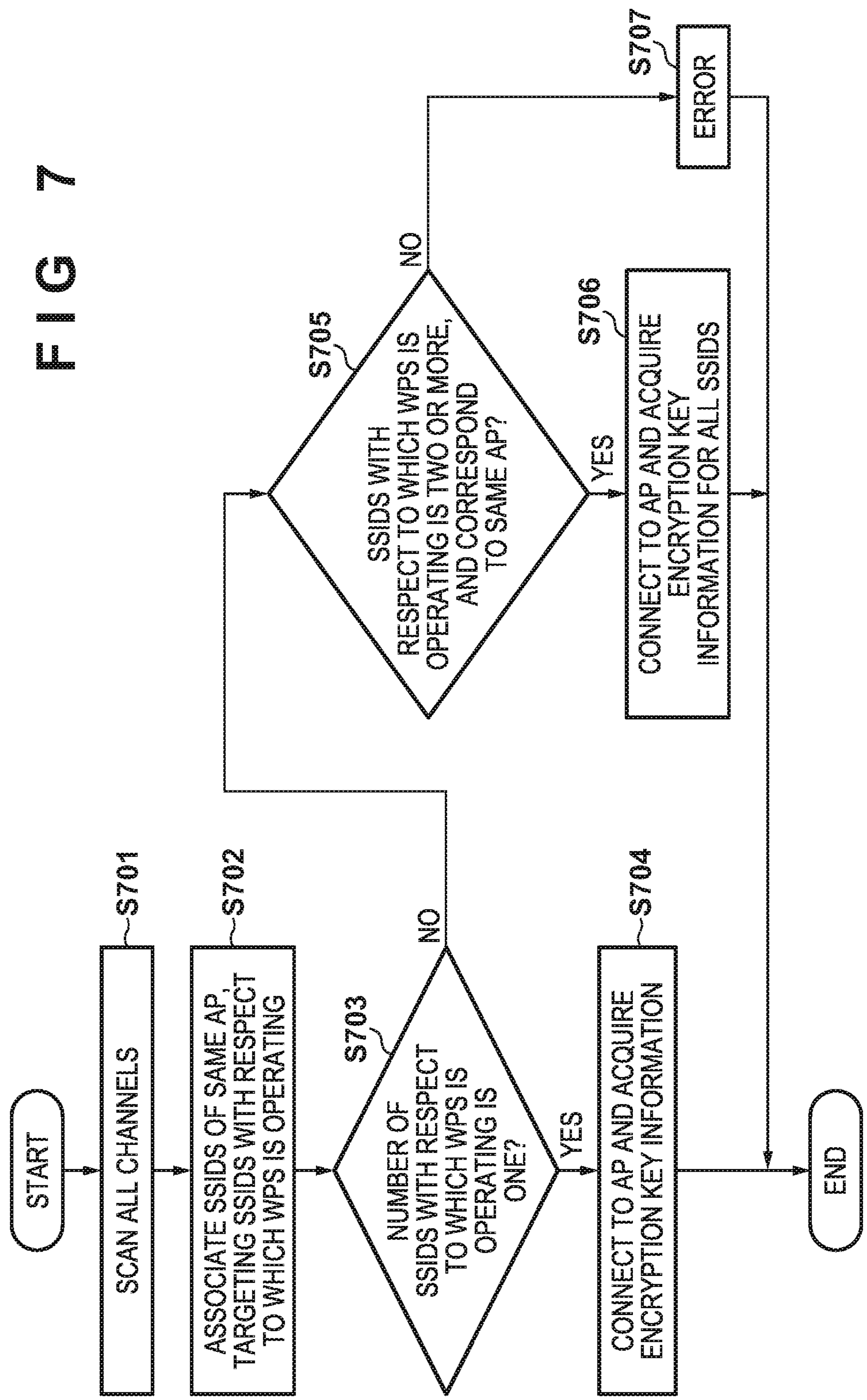
F I G 7
START
SCAN ALL CHANNELS
S701
ASSOCIATE SSIDS OF SAME AP, TARGETING SSIDS WITH RESPECT TO WHICH WPS IS OPERATING
S702
NUMBER OF SSIDS WITH RESPECT TO WHICH WPS IS OPERATING IS ONE?
S703
YES
NO
CONNECT TO AP AND ACQUIRE ENCRYPTION KEY INFORMATION
S704
SSIDS WITH RESPECT TO WHICH WPS IS OPERATING IS TWO OR MORE, AND CORRESPOND TO SAME AP?
S705
YES
NO
CONNECT TO AP AND ACQUIRE ENCRYPTION KEY INFORMATION FOR ALL SSIDS
S706
ERROR
S707
END

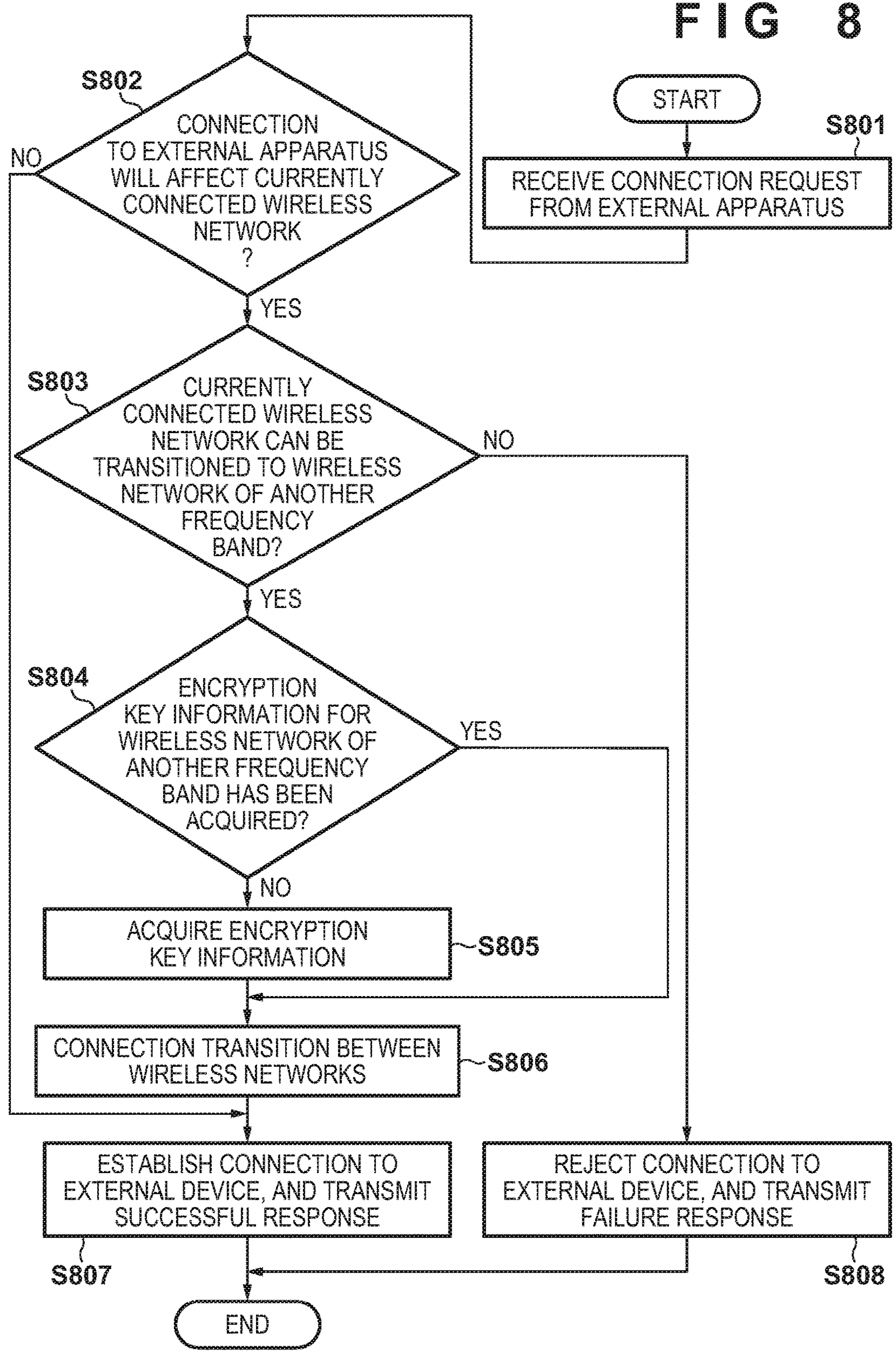
FIG 8
START
S801
RECEIVE CONNECTION REQUEST FROM EXTERNAL APPARATUS
S802
CONNECTION TO EXTERNAL APPARATUS WILL AFFECT CURRENTLY CONNECTED WIRELESS NETWORK ?
NO
YES
S803
CURRENTLY CONNECTED WIRELESS NETWORK CAN BE TRANSITIONED TO WIRELESS NETWORK OF ANOTHER FREQUENCY BAND?
NO
YES
S804
ENCRYPTION KEY INFORMATION FOR WIRELESS NETWORK OF ANOTHER FREQUENCY BAND HAS BEEN ACQUIRED?
YES
NO
ACQUIRE ENCRYPTION KEY INFORMATION
S805
CONNECTION TRANSITION BETWEEN WIRELESS NETWORKS
S806
ESTABLISH CONNECTION TO EXTERNAL DEVICE, AND TRANSMIT SUCCESSFUL RESPONSE
REJECT CONNECTION TO EXTERNAL DEVICE, AND TRANSMIT FAILURE RESPONSE
S807
S808
END

COMMUNICATION APPARATUS AND CONTROL METHOD THEREOF

BACKGROUND OF THE INVENTION

Field of the Invention

The present invention relates to a communication apparatus and control method thereof, particularly relates to network connection processing in a communication apparatus capable of simultaneously connecting at a plurality of frequency bands.

Description of the Related Art

In recent years, mobile devices such as smart phones, tablet terminals and digital cameras equipped with a wireless LAN station function, so as to connect to an access point of a wireless LAN (Local Area Network) and use cloud services such as SNSs (Social Networking Services) have been increasing. Japanese Patent Laid-Open No. 2011-035768 discloses a method for uploading image data to a server using a wireless LAN by a digital camera being equipped with a wireless LAN function.

Meanwhile, recently, cases in which devices are equipped with a Wi-Fi Direct function are also increasing. Wi-Fi Direct is a communication protocol standard for P2P (peer-to-peer) connection established by Wi-Fi Alliance. Wi-Fi Direct enables exchange of information such as image files between mobile devices in an environment in which there are no access points.

It is envisioned that future mobile devices will be able to perform simultaneous connection at a plurality of frequency bands, such as performing connection to a wireless LAN and P2P connection of mobile devices at the same time, for example.

Incidentally, a wireless network used for wireless LAN connection and a wireless network used for P2P connection are different. Therefore, in order to realize wireless LAN connection and P2P connection at the same time, it is necessary to use different frequency bands so as to prevent the effects of mutual radio wave interference. Specifically, it is necessary that one of the 2.4 GHz band and the 5 GHz band defined by the IEEE 802.11 standard is used for wireless LAN connection, and the other is used for P2P connection.

SUMMARY OF THE INVENTION

The present invention has been made in consideration of the aforementioned problems, and realizes a technique that can improve operability when connecting to a wireless network that enables simultaneous connection at a plurality of frequency bands.

In order to solve the aforementioned problems, the present invention provides a communication apparatus comprising: a search unit configured to search for wireless networks which use a first frequency band and wireless networks which use a second frequency band; an association unit configured to associate a first wireless network which uses the first frequency band with a second wireless network which uses the second frequency band, from among the wireless networks found by the search unit, the first wireless network and the second wireless network being formed by the same device; a selection unit configured to select, from the wireless networks found by the search unit, a wireless network to connect to; and an authentication unit configured to perform authentication processing for connecting to the wireless network selected by the selection unit, wherein, in a case where the first wireless network is selected by the selection unit, the authentication unit performs control so as to perform authentication processing for connecting to the first wireless network selected by the selection unit and perform authentication processing for connecting to the second wireless network associated with the first wireless network by the association unit.

In order to solve the aforementioned problems, the present invention provides a control method of a communication apparatus comprising: searching for wireless networks which use a first frequency band and wireless networks which use a second frequency band; associating a first wireless network which uses the first frequency band with a second wireless network which uses the second frequency band, from among the wireless networks found by the search, the first wireless network and the second wireless network being formed by the same device; selecting, from the wireless networks found by the search, a wireless network to connect to; and performing authentication processing for connecting to the selected wireless network, wherein, in a case where the first wireless network is selected, control is performed so as to perform authentication processing for connecting to the selected first wireless network and perform authentication processing for connecting to the second wireless network associated with the first wireless network.

According to the present invention, it is possible to improve operability when connecting to a wireless network that enables simultaneous connection at a plurality of frequency bands.

Further features of the present invention will become apparent from the following description of exemplary embodiments (with reference to the attached drawings).

BRIEF DESCRIPTION OF THE DRAWINGS

FIG. 5 is a flowchart showing processing for manually connecting to a wireless LAN by the communication apparatus of the embodiment.

FIGS. 6A to 6D are diagrams for describing a method for searching for an access point of a wireless LAN of the embodiment.

FIG. 7 is a flowchart showing processing for automatically connecting to a wireless LAN by the communication apparatus of the embodiment.

FIG. 8 is a flowchart showing wireless network connection transition processing by the communication apparatus of the embodiments.

DESCRIPTION OF THE EMBODIMENTS

Embodiments of the present invention will be described in detail below. The following embodiments are merely examples for practicing the present invention. The present invention should not be limited to the following embodiments. Also, parts of the embodiments to be described later may be properly combined.

An example of a wireless communication system that is applied to a smart phone (which is a type of a mobile phone) as a communication apparatus of an embodiment of the present invention will be described below. The smart phone realizes connection to a wireless LAN conforming to IEEE 802.11 and P2P connection to a digital camera as an external apparatus at the same time. Note that the present invention is not limited thereto, and can be applied to digital cameras, tablets, personal computers, PDAs (Personal Digital Assistants), portable AV players, game consoles, electronic books and the like having a wireless communication function that enables simultaneous connection at a plurality of frequency bands.

Moreover, an example of a wireless communication system for realizing connection to a wireless LAN conforming to IEEE 802.11 and P2P connection at the same time will be described below, but the communication mode is not necessarily limited to a wireless LAN conforming to IEEE 802.11.

Hardware Configuration of Communication Apparatus

First, a hardware configuration of a communication apparatus of the present embodiment will be described with reference to FIG. 1.

Figure 1:
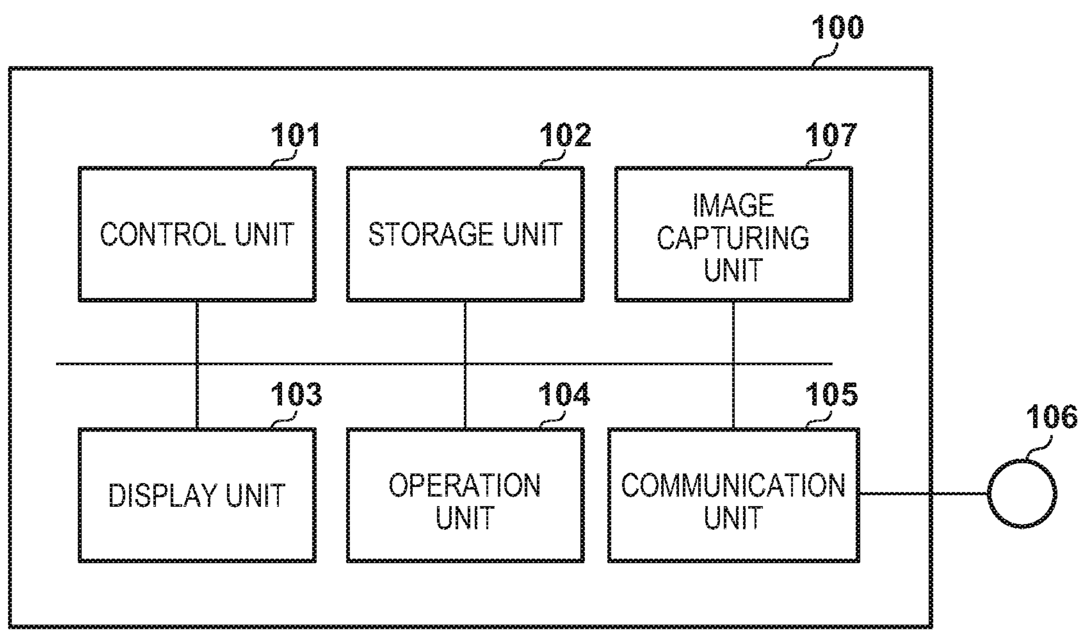
FIG. 1 is a hardware configuration diagram of a communication apparatus of an embodiment according to the present invention.

FIG. 1 is a block diagram showing an example of a hardware configuration of a communication apparatus 100 of the present embodiment.

The control unit 101 controls the entire communication apparatus by performing a control program stored in the storage unit 102. The control unit 101 includes one or more processors such as a CPU or MPU.

The storage unit 102 stores the control program performed by the control unit 101 and various types of information such as communication parameters. Also, the storage unit 102 may store image data, other files, and the like that have been generated by the communication apparatus itself or have been received from an external apparatus such as a digital camera. Various types of memories such as a ROM, a RAM, a HDD, and a flash memory are used as the storage unit 102. Note that the operations of sequences and flowcharts, which will be described later, are realized by the control unit 101 performing the control program stored in the storage unit 102.

The display unit 103 has a LCD or a LED that carries out various types of displays, and has a function of outputting visually recognizable information. Also, the display unit 103 may have a function with which audio can be output, such as a speaker.

The operation unit 104 is an input unit configured to accept various types of operation inputs by a user, and includes various buttons, a touch panel and the like for operating the communication apparatus.

The communication unit 105 performs communication processing by a wireless LAN conforming to IEEE 802.11 so as to transmit and receive control signals and data signals through wireless communication by controlling the antenna 106. The communication unit 105 has a function of converting digital data such as image files into radio waves of a specific frequency and transmitting the radio waves via the antenna 106, and a function of converting the radio waves of a specific frequency received via the antenna 106 into digital data. Processing for converting digital data into radio waves is called modulation. The communication unit 105 has a function of modulating the 2.4 GHz and 5 GHz frequency bands stipulated by IEEE 802.11. The communication unit 105 also has a function of performing the modulation processing of the 2.4 GHz and 5 GHz frequency bands at the same time.

The image capturing unit 107 includes an optical lens, a CMOS image sensor, a digital image processing unit, and the like, and converts an analog signal input via the optical lens into digital data to generate image data. The image data generated by the image capturing unit 107 is stored in the storage unit 102.

Note that the hardware configuration shown in FIG. 1 is an example, and the communication apparatus 100 of this embodiment may have a hardware configuration other than the hardware configuration shown in FIG. 1.

Software Configuration of Communication Apparatus

Next, a software configuration of the communication apparatus 100 of the present embodiment will be described with reference to FIG. 2.

Figure 2:
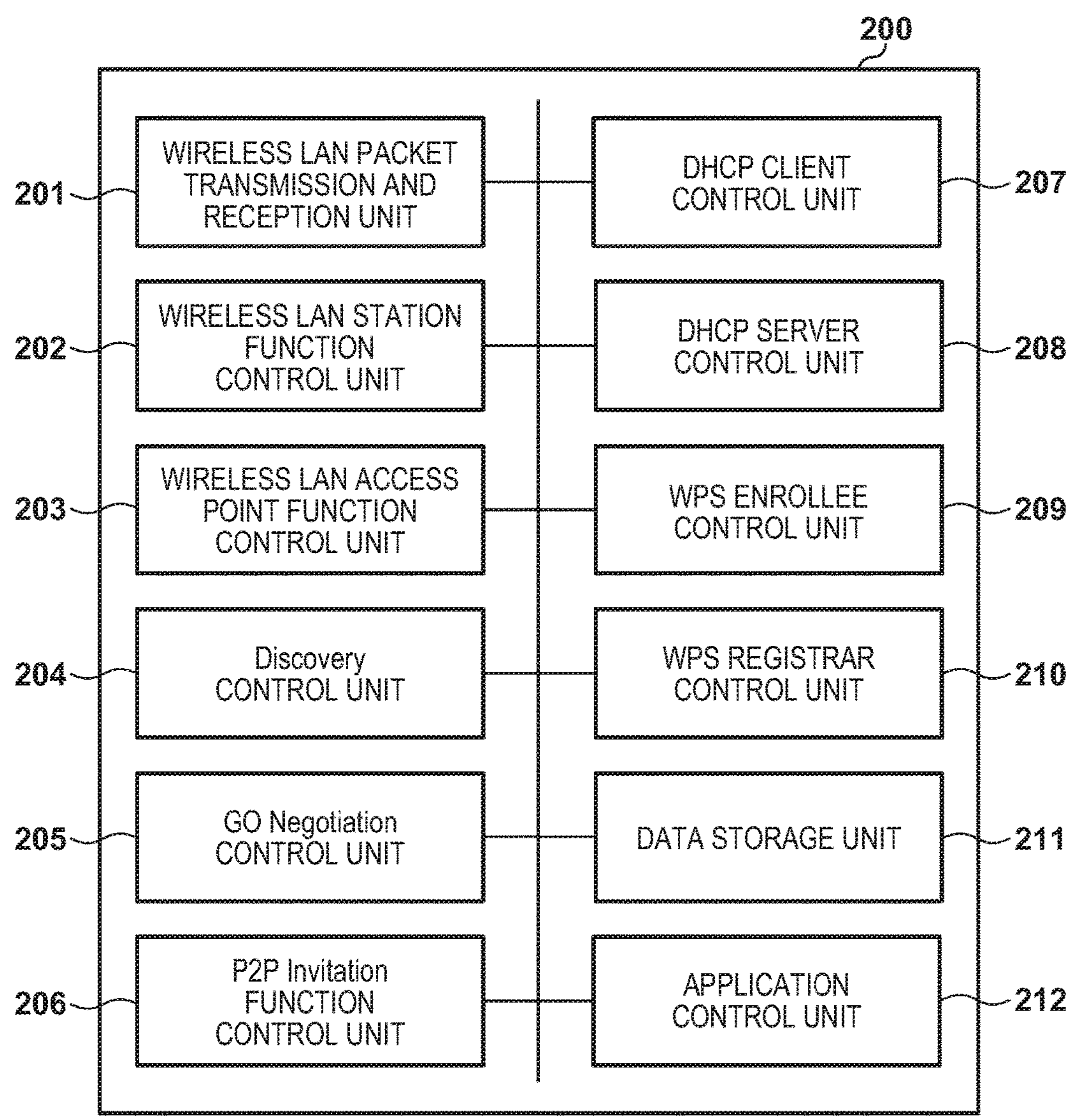
FIG. 2 is a software configuration diagram of a communication apparatus of the embodiment.

FIG. 2 is a diagram showing an example of a configuration of a software function block 200 for performing a communication control function that is provided in the communication apparatus 100 of the present embodiment.

The software function block 200 includes function blocks 201 to 212 shown in FIG. 2.

A wireless LAN packet transmission and reception unit 201 administers transmission and reception of all packets including a communication protocol of an upper layer.

The wireless LAN station function control unit 202 performs authentication and encryption processing and the like when the communication apparatus 100 operates as a wireless LAN station, and joins a wireless network formed by an apparatus that operates as a wireless LAN access point.

The wireless LAN access point function control unit 203 forms a wireless network when the communication apparatus 100 operates as a wireless LAN access point function, and performs authentication and encryption processing, management of a communication partner apparatus and the like. Either the wireless LAN station function control unit 202 or the wireless LAN access point function control unit 203 can function at one time, or the wireless LAN station function control unit 202 and the wireless LAN access point function control unit 203 can operate at the same time.

The discovery control unit 204 performs service searching processing for searching for an external apparatus that serves as a communication partner.

A GO negotiation control unit 205 performs control that is based on the Wi-Fi Direct protocol, and determines the roles of the communication apparatuses in the wireless layer, that is, which communication apparatus is to be the wireless LAN access point and which communication apparatus is to be the wireless LAN station. Regarding Wi-Fi Direct, a communication apparatus that performs the wireless LAN access point function is called a P2P group owner (hereinafter, GO), and a communication apparatus that performs the wireless LAN station function is called a P2P client (hereinafter, CL). In the case of a GO or a wireless LAN access point, the wireless LAN access point function control unit 203 is activated, and in the case of a CL or a wireless LAN station, the wireless LAN station function control unit 202, which will be described later, is activated. The functions of the GO negotiation control unit 205 are determined by the Wi-Fi Direct protocol, and detailed description is omitted.

The P2P invitation function control unit 206 controls an invitation function stipulated by the Wi-Fi Direct protocol. While the invitation function is stipulated by the Wi-Fi Direct protocol, and thus detailed description is omitted, the invitation function is a function of the GO apparatus or the CL apparatus prompting a P2P apparatus whose role has not been determined to connect as a P2P client.

The DHCP (Dynamic Host Configuration Protocol) client control unit 207 is activated when the communication apparatus 100 connects to a network as a wireless LAN station.

The DHCP server control unit 208 is activated when the role of the communication apparatus 100 becomes the wireless LAN access point.

A WPS enrollee control unit 209 (where WPS stands for Wi-Fi Protected Set-up) receives a communication parameter necessary for wireless LAN communication from another WPS registrar apparatus. Similarly to the DHCP client control unit 207, the WPS enrollee control unit 209 operates in the case where the role of the communication apparatus 100 is the wireless LAN station.

A WPS registrar control unit 210 provides a communication parameter necessary for wireless LAN communication to another WPS enrollee apparatus. Similarly to the DHCP server control unit 208, the WPS registrar control unit 210 operates in the case where the role of the communication apparatus 100 is the wireless LAN access point. Note that as the communication parameter provided by a WPS registrar, an SSID (service set identifier), an encryption key, an encryption system, an authentication key or an authentication system as a network identifier, or the like is used.

A data storage unit 211 has a function of storing actual software, wireless LAN parameters, various tables such as a DHCP address table and an ARP table.

An application control unit 212 controls file transfer that uses a wireless communication function, and the functions of applications of an upper layer such as a Web browser.

Note that all function blocks shown in FIG. 2 are not limited to those provided by software, and at least a portion of all the function blocks may be provided by hardware. In addition, the function blocks shown in FIG. 2 are interrelated. Also, the function blocks shown in FIG. 2 are examples. A plurality of the function blocks may constitute one function block, and any function block may be divided into blocks that further perform a plurality of functions.

Wireless Network Configuration

Figure 3:
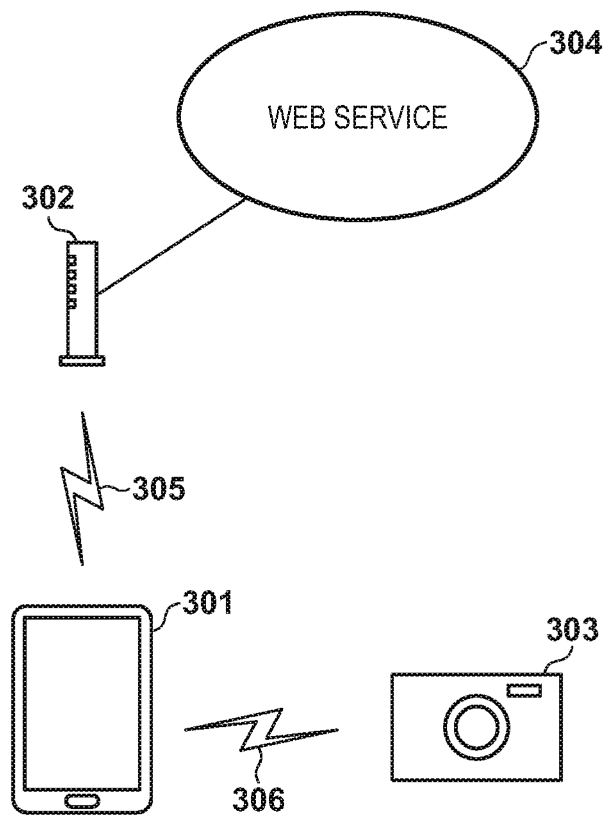
FIG. 3 is a configuration diagram of a wireless network system of the embodiment.

Next, the wireless network configuration in this embodiment will be described with reference to FIG. 3.

Assume that a communication apparatus 301 has the hardware configuration shown in FIG. 1 and the software configuration shown in FIG. 2.

Reference numeral 302 denotes an access point (hereinafter, also referred to as an AP) of a wireless LAN.

The external apparatus 303 is a communication partner of the communication apparatus 301, and a tablet, a smart phone, which is a type of a mobile phone, a digital camera or the like serves as the external apparatus 303. In this embodiment, a digital camera is illustrated. Assume that the external apparatus 303 has the hardware configuration shown in FIG. 1 and the software configuration shown in FIG. 2, similarly to the communication apparatus 301.

The web service 304 exists on the Internet connected via the AP 302, and an image sharing service or the like serves as the web service 304. The communication apparatus 301 can use Web services on the Internet via the AP 302.

The communication apparatus 301 and the AP 302 are communicably connected through the wireless LAN 305. FIG. 3 illustrates a state in which the communication apparatus 301 is connected to a wireless network generated by the AP 302 in an infrastructure mode. Moreover, the communication apparatus 301 and the external apparatus 303 are communicably connected through a wireless LAN 306. FIG. 3 illustrates a state in which the communication apparatus 301 and the external apparatus 303 are P2P-connected using Wi-Fi Direct. Note that the wireless LANs 305 and 306 are different wireless networks.

Wireless LAN Connection Processing

Next, processing for connecting the communication apparatus 301 of this embodiment to a wireless LAN will be described with reference to FIGS. 4A to 4D.

Figure 4A:
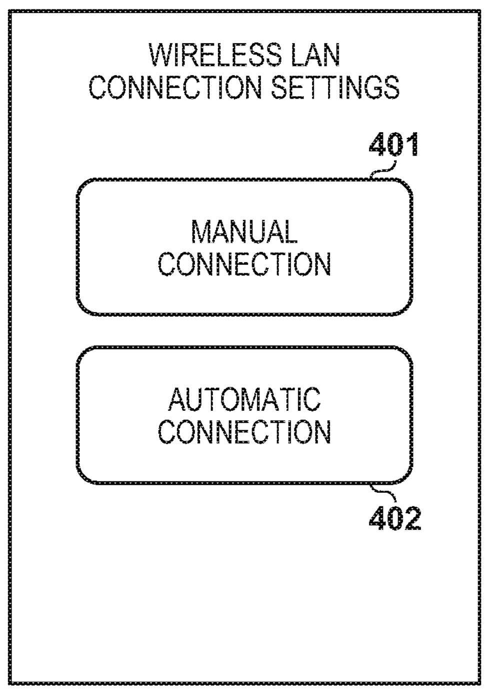
FIGS. 4A to 4D are diagrams for describing wireless LAN connection processing by the communication apparatus of the embodiment.

FIG. 4A illustrates a screen that is initially displayed on the display unit 103 regarding wireless LAN connection settings of the communication apparatus 301. A user can select manual connection 401 or automatic connection 402 as a method for connecting the communication apparatus to the AP 302.

In the case where the manual connection 401 is selected on the screen shown in FIG. 4A, scan processing for detecting APs that exist in the vicinity of the communication apparatus 301 is performed, and an SSID list of the detected APs is displayed on the display unit 103. After that, processing for connecting the communication apparatus 301 to the AP selected by the user is performed. At this time, input of authentication information for connecting the communication apparatus 301 to the AP is accepted.

In the case where the automatic connection 402 is selected on the screen shown in FIG. 4A, automatic connection processing using a PBC system (where PBC stands for Push-button configuration) of WPS (WiFi Protected Setup) is performed.

Processing for manually connecting the communication apparatus 301 to a wireless LAN and processing for automatically connecting the communication apparatus 301 to a wireless LAN will be described in detail below.

Manual Connection Processing

First, processing for manually connecting the communication apparatus 301 of this embodiment to a wireless LAN will be described with reference to FIG. 5.

Note that processing of each of the steps shown in this flowchart is realized by the control unit 101 performing a program stored in the storage unit 102. The same applies to flowcharts shown in FIGS. 7 and 8, which will be described later.

In step S501, the control unit 101 searches for wireless LAN access points that exist in the vicinity of the communication apparatus 301. As a searching method, at least one of a method for receiving a beacon frame that is regularly transmitted from an AP and a method for broadcast-transmitting a search request frame and receiving a search response frame that is transmitted as a search response from an AP is used. In the latter method, the control unit 101 transmits probe request signals to all the channels having the 2.4 GHz or 5 GHz frequency band via the communication unit 105, and receives probe response signals that are returned from the APs that exist in the vicinity of the communication apparatus. The probe response signals each include information such as a BSSID (Basic Service Set Identifier), an ESSID (Extended Service Set Identifier) ID, and a UUID (Universally Unique Identifier). FIG. 6A shows an example of the contents of received probe response signals. FIG. 6A shows a case in which six probe response signals were received. The BSSID and ESSID are wireless LAN identifiers. The BSSID has a value expressed by the MAC address of the AP, and the ESSID is constituted by alphanumeric characters that are easily identified by the user. The UUID is an identifier unique to every AP.

In step S502, the control unit 101 analyzes the probe response signals received in step S501, and associates SSIDs of the same AP with each other. Specifically, the values of the UUIDs included in the probe response signals are compared, and in the case where the values are the same, it is determined that the probe response signals are from the same AP, and the probe response signals are associated with each other. FIG. 6B shows a state after the SSIDs are associated with each other. Reference numeral 601 denotes a column that indicates the association. For example, "NA" will be displayed for No. 1 (SSID="BBBBB") since there is no SSID that has the same UUID as No. 1. For example, No. 2 (SSID="AAAAA-g") is associated with corresponding No. 5 (SSID="AAAAA-a"), which includes the same UUID.

Figure 4B:
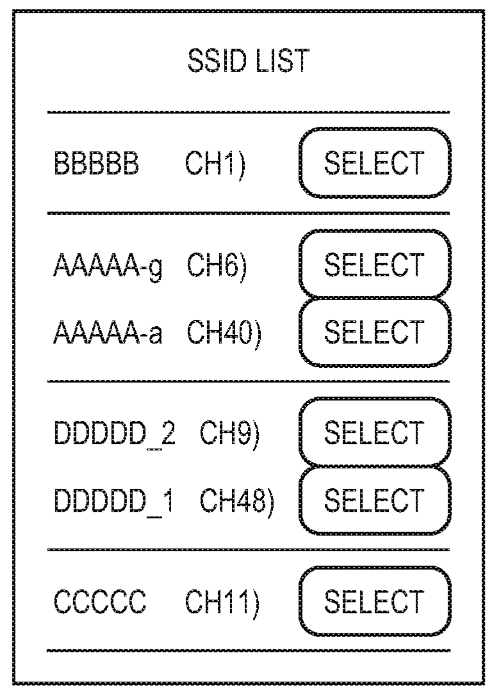

In step S503, the control unit 101 displays the SSID list such that the SSIDs are arranged by AP, based on the SSID information associated in step S502. FIG. 4B shows an example of an SSID list displayed on the display unit 103. As shown in FIG. 4B, the SSIDs are displayed in the order of AP.

In step S504, the control unit 101 accepts an instruction to select an SSID by the user via the operation unit 104.

In step S505, the control unit 101 determines whether or not there is another SSID that is associated with the selected SSID. Specifically, determination is performed based on association No. information illustrated in FIG. 6B. In the case where as a result of the determination, there is another associated SSID, the procedure advances to step S506, and otherwise the procedure advances to step S510.

In step S506, the control unit 101 determines whether or not encryption keys for all the associated SSIDs are held, specifically, whether or not all of the encryption keys are stored in the storage unit 102. In the case where a result of the determination indicates that all of the encryption keys are stored, the procedure advances to step S510, and otherwise the procedure advances to step S507.

Figure 4C:
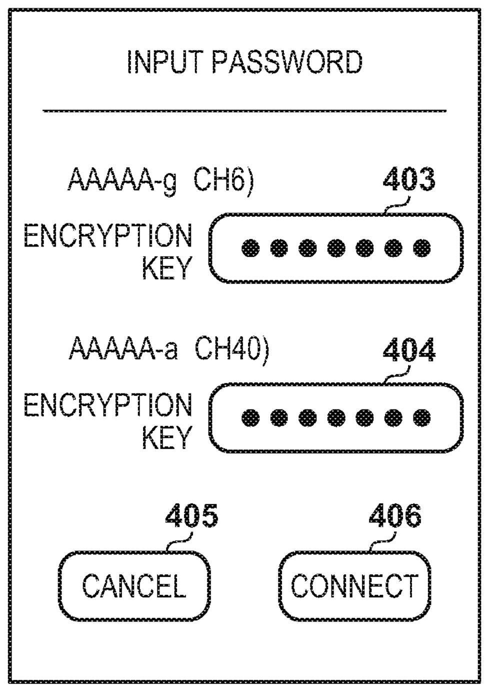

In step S507, the control unit 101 accepts input of the encryption keys for all the associated SSIDs. Specifically, an encryption key input screen is displayed on the display unit 103, so as to accept, via the operation unit 104, the input of the encryption keys by the user. FIG. 4C shows an example of a screen for inputting encryption keys for SSID="AAAAA-g" and SSID="AAAAA-a", which is displayed on the display unit 103.

The screen in FIG. 4C is displayed in the case where SSID="AAAAA-g" or SSID="AAAAA-a" is selected in the SSID list shown in FIG. 4B. Reference numeral 403 denotes an encryption key input field for connecting to (the AP corresponding to) SSID="AAAAA-g". Reference numeral 404 denotes an encryption key input field for connecting to (the AP corresponding to) SSID="AAAAA-a". Reference numeral 405 denotes a cancel button for returning to the SSID list screen. Reference numeral 406 denotes a connection button. When the encryption keys are input, and the connection button 406 is pressed, the procedure advances to step S508.

In step S508, the control unit 101 performs tests for connection to wireless LANs that correspond to all the associated SSIDs using input encryption keys. Specifically, using authentication request signals and association request signals, tests for connection to the wireless LANs for all the SSIDs are performed. Note that a connection test is performed for one SSID at a time. Therefore, processing for connecting to the second SSID is performed after disconnecting from the first SSID.

In step S509, the control unit 101 determines whether or not the connection tests performed in step S508 were successful. In the case where all the tests were successful, the encryption key information input in step S507 is stored in the storage unit 102, and the procedure advances to step S510. In the case where all the tests were not successful, the procedure returns to step S507.

In step S510, the control unit 101 connects the communication apparatus to a wireless LAN that corresponds to the SSID selected in step S504, and ends this processing. Note that in this step, in the case where the SSID connected lastly in step S509 and the SSID selected in step S504 are the same, the connection may be maintained.

In step S511, the control unit 101 determines whether or not the encryption key for the selected SSID is held, specifically, whether or not the encryption key for the selected SSID is stored in the storage unit 102. In the case where the encryption key is stored, the procedure advances to step S515, and otherwise the procedure advances to step S512.

Figure 4D:
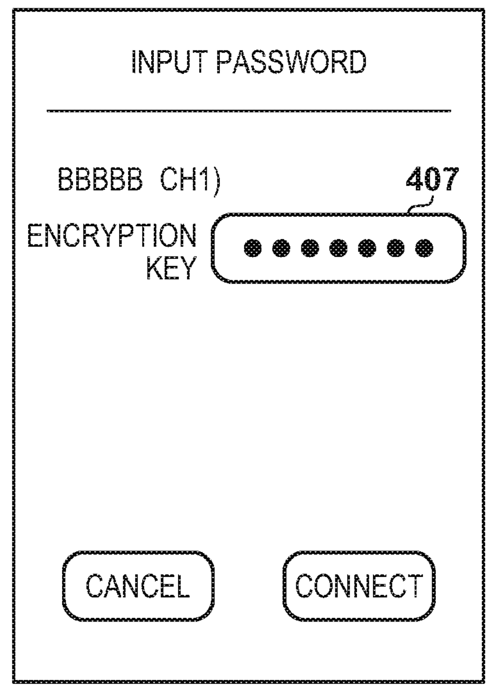

In step S512, the control unit 101 accepts input of the encryption key for the SSID selected in step S504. Specifically, an encryption key input screen is displayed on the display unit 103, and the input of the encryption key by the user is accepted via the operation unit 104. FIG. 4D shows an example of a screen for inputting an encryption key for SSID="BBBBB", which is displayed on the display unit 103. The screen in FIG. 4C is displayed in the case where SSID="BBBBB" is selected in the SSID list shown in FIG. 4B. Reference numeral 407 denotes an encryption key input field for connecting to (the AP corresponding to) SSID="BBBBB".

In step S513, the control unit 101 performs a test for connection to a wireless LAN that corresponds to the SSID using the input encryption key. Specifically, the test for connection to the wireless LAN regarding the SSID is performed using authentication request signals and association request signals.

In step S514, the control unit 101 determines whether or not the connection test performed in step S513 was successful. In the case where the connection test was successful, the encryption key information input in step S512 is stored in the storage unit 102, and the procedure advances to step S515. In the case where the connection test was not successful, the procedure returns to step S512.

In step S515, the control unit 101 connects the communication apparatus to the wireless LAN that corresponds to the SSID selected in step S504, and ends this processing. Note that in this step, the connected state in step S514 may be maintained.

Note that in step S502, determination of whether or not the APs are the same AP was performed using UUIDs, but in the case where the probe response signals do not include information that corresponds to UUIDs, a method for determination using BSSIDs may be performed. As described above, a BSSID is constituted by an MAC address, and thus in the case of the same apparatus, the values of high-order 24 bits indicating a vendor ID are the same. Moreover, in the case of the same apparatus, the values of low-order 24 bits indicating a unique production number are substantially the same in most cases. Therefore, a configuration may be adopted in which it is determined whether or not the APs are the same AP by comparing a predetermined number of high-order bits (e.g., 40 bits) of the BSSIDs.

Automatic Connection Processing (WPS System)

Next, processing for automatically connecting the communication apparatus 301 of this embodiment to a wireless LAN will be described with reference to FIG. 7.

In step S701, similarly to step S501, the control unit 101 searches for wireless LAN access points that exist in the vicinity of the communication apparatus 301. As a searching method, at least one of a method for receiving a beacon frame that is regularly transmitted from an AP and a method for broadcast-transmitting a search request frame and receiving a search response frame that is transmitted as a search response from the AP is used. In the latter method, the control unit 101 transmits probe request signals to all the channels having the 2.4 GHz or 5 GHz frequency band via the communication unit 105, and receives probe response signals that are returned from the access points that exist in the vicinity. The probe response signals each include information such as a BSSID, an ESSID, and a UUID, and information indicating whether or not the AP is operating by using a PBC system of WPS. FIG. 6C shows an example of the contents of the received probe response signals. FIG. 6C shows an example in the case where six probe response signals were received. Reference numeral 602 denotes a column for information indicating whether or not WPS is operating. Specifically, probe response signals include a "Device Password ID" field, and if the value in the "Device Password ID" field is 0x0004, YES is displayed, and otherwise NO is displayed.

In step S702, the control unit 101 analyzes the probe response signals received in step S701, and, targeting SSIDs with respect to which WPS is operating, associates SSIDs of the same AP with each other. Specifically, the values of the UUIDs included in the probe response signals are compared, and in the case where the values of the UUIDs are the same, it is determined that the probe response signals are from the same AP, and the probe response signals are associated with each other. FIG. 6D shows a state after the association. Reference numeral 603 denotes a column that indicates the association. SSIDs (No. 2 and No. 5) with respect to which WPS is operating and that have the same UUIDs are associated with each other.

In step S703, the control unit 101 determines whether or not the number of SSIDs with respect to which WPS is operating is one. In the case where the number of the SSIDs is one, the procedure advances to step S704, and otherwise the procedure advances to step S705.

In step S704, the control unit 101 connects the communication apparatus to a wireless LAN regarding the SSID with respect to which WPS is operating, and acquires authentication information such as an encryption key from the AP. Specifically, the authentication information is acquired by performing processing of a protocol called Registration Protocol defined by the WPS standard. Note that the authentication information acquired in this step is stored in the storage unit 102, and will be used for later manual connection processing. Specifically, YES is determined in steps S506 and S511 in FIG. 5, and input of the encryption key by the user is omitted. The control unit 101 ends this step, and then ends this processing in a state where the communication apparatus 301 is connected to the wireless LAN.

In step S705, the control unit 101 determines whether or not the number of SSIDs with respect to which WPS is operating is two or more and whether or not those SSIDs correspond to the same AP. In the case where the conditions are satisfied, the procedure advances to step S706, and otherwise the procedure advances to step S707. Specifically, in FIG. 6D, it is determined whether or not the number of SSIDs with respect to which "YES" is displayed in the column "WPS operating" is two or more and it is indicated in the column "association No." that those SSIDs are associate with each other. In the example in FIG. 6D, YES is determined.

In step S706, the control unit 101 connects to a wireless LAN of any one of SSIDs with respect to which WPS is operating, and acquires authentication information such as encryption keys for all the SSIDs from the AP. An SSID to be connected to may be arbitrarily selected, may be selected such that available channels are prioritized, or may be selected such that the 5 GHz band is prioritized. As processing for acquiring the authentication information, protocol processing similar to step S704 is performed. Note that the authentication information acquired in this step is stored in the storage unit 102, and will be used for later manual connection processing. Specifically, YES is determined in steps S506 and S511 in FIG. 5, and input of the encryption key by the user is omitted. The control unit 101 ends this step, and then ends this processing in a state where the communication apparatus 301 is connected to the wireless LAN.

In step S707, the control unit 101 performs error processing for the automatic connection processing that uses WPS, and ends this processing. Specifically, in the case where it is determined in step S705 that the number of SSIDs with respect to which WPS is operating is two or more but the SSIDs do not correspond to the same AP, the processing ends with a session overlap error. In the case where it is determined in step S705 that the number of SSIDs with respect to which WPS is operating is not two or more, in other words, zero, the processing ends with a timeout error.

Processing for Connection Transition Between Wireless Networks

Next, processing for connection transition of the communication apparatus 301 of this embodiment between wireless networks will be described with reference to FIG. 8.

In step S801, the control unit 101 receives, from the external apparatus 303, a request for connection to a wireless network. Specifically, P2P connection between the communication apparatus 301 and the external apparatus 303 using Wi-Fi Direct is started.

In step S802, the control unit 101 determines whether or not the connection to the external apparatus 303 will affect communication with a wireless network to which the communication apparatus 301 is already connected. In the case where it is determined that the connection to the external apparatus 303 will affect communication with a wireless network to which the communication apparatus 301 is connected, the procedure advances to step S803, and otherwise the procedure advances to step S807. In the case where there is no wireless network that is in connection, the determination will be No. In the case where there is a wireless network to which the communication apparatus 301 is connected, it is determined whether or not a frequency band that is used by the wireless network and a frequency band that is used for the connection to the external apparatus 303 are in a close enough range for mutual radio wave interference to occur.

In step S803, the control unit 101 determines whether or not the wireless network to which the communication apparatus 301 is connected can be transitioned to a wireless network of another frequency band while maintaining the communication state of a high order protocol. Specifically, in the case where a shared AP that generates the wireless LAN to which the communication apparatus 301 is connected generates a wireless LAN of another frequency band, it is determined that connection transition is possible, and otherwise NO is determined. This determination processing is performed by receiving probe response signals, and using the values of the UUIDs included therein similarly to the above-described processing in step S502. For example, in the case where the communication apparatus 301 is connected to the wireless LAN corresponding to SSID="AAAAA-g" in FIG. 6B, the same AP generates a wireless LAN of another frequency band (SSID="AAAAA-a"), and thus the determination result in this step will be YES.

In step S804, the control unit 101 determines whether or not the encryption key information for connecting to the wireless LAN of another frequency band has been acquired, specifically, whether or not this encryption key information is stored in the storage unit 102. In the case where a result of the determination indicates that the encryption key information is stored, the procedure advances to step S806, otherwise the procedure advances to step S805. In the case where the above-described manual connection processing (FIG. 5) or automatic connection processing (FIG. 7) has been performed in advance, the determination result in this step will be YES.

In step S805, the control unit 101 performs processing for acquiring the encryption key information. Specifically, an encryption key input screen is displayed on the display unit 103, and the user is prompted to input the encryption key via the operation unit 104. The encryption key input screen is similar to that in FIG. 4D.

In step S806, the control unit 101 performs processing for connection transition between wireless networks. Specifically, while maintaining the communication state of a high order protocol, the communication apparatus is disconnected from the wireless LAN, and is connected to a wireless LAN of another frequency band that is generated by the same AP. At this time, for connection to the wireless LAN of another frequency band, the encryption key acquired in steps S804 and S805 is used.

In step S807, the control unit 101 establishes connection with the wireless network that is in response to the connection request from the external apparatus 303, transmits a successful response to the external apparatus 303, and ends this processing. Specifically, Wi-Fi Direct P2P connection requested in step S801 is established.

In step S808, the control unit 101 rejects the connection to the external apparatus 303, transmits a failure response to the external apparatus 303, and ends this processing.

By performing the above-described processing for manually connecting to a wireless LAN and processing for automatically connecting to a wireless LAN, as well as processing for connection transition between wireless networks, connection of wireless LANs can be transitioned in response to a P2P connection request from the external apparatus, such that the frequency bands of wireless LANs to which the communication apparatus 301 is connected do not overlap. Accordingly, it is possible to improve the operability when connecting to a wireless network to which simultaneous connection at a plurality of frequency bands is possible.

Other Embodiments

AIn example of a wireless LAN conforming to IEEE 802.11 as the wireless communication function has been described in the present embodiment. However, the present invention may be implemented using other wireless communication such as a wireless USB, MBOA (Multi Band OFDM Alliance), Bluetooth (registered trademark), UWB, or ZigBee (registered trademark). Also, the present invention may be implemented in a wired communication medium such as a wired LAN. Note that the UWB includes a wireless USB, a wireless 1394, WINET, and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-158494, filed Aug. 10, 2015, which is hereby incorporated by reference herein in its entirety.

What is claimed is:

1. A communication apparatus comprising:

a processor; and a memory coupled to the processor storing instructions that, when executed by the processor, cause the processor to function as:

a search unit configured to search for wireless networks which use a first frequency band and wireless networks which use a second frequency band;

an association unit configured to associate a first wireless network which uses the first frequency band with a second wireless network which uses the second frequency band, from among the wireless networks found by the search unit, the first wireless network and the second wireless network being formed by the same device;

a selection unit configured to select, from the wireless networks found by the search unit, a wireless network to connect to;

an authentication unit configured to perform authentication processing for connecting to the wireless network selected by the selection unit; and a storage unit configured to store authentication information, wherein, in a case where the first wireless network is selected by the selection unit, the authentication unit performs control so as to perform authentication test processing for connecting to the first wireless network and perform authentication test processing for connecting to the second wireless network associated with the first wireless network by the association unit before connecting to the first wireless network selected by the selection unit, and the storage unit stores authentication information regarding the first and second wireless networks for which the authentication test processing is successful.

2. The apparatus according to claim 1, wherein the authentication processing includes processing for displaying a screen for inputting key information as the authentication information.

3. The apparatus according to claim 2, wherein the screen for inputting key information includes, on one screen, an area for inputting key information corresponding to the first wireless network and an area for inputting key information corresponding to the second wireless network.

4. The apparatus according to claim 2, wherein in a case where key information corresponding to the selected first wireless network and key information corresponding to the second wireless network have been input on the screen for inputting key information, the authentication unit tries to connect to the first wireless network and the second wireless network.

5. The apparatus according to claim 2, wherein in a case where the key information corresponding to the selected first wireless network and key information corresponding to the second wireless network have been input on the screen for inputting key information, the authentication unit sequentially tries to connect to the first wireless network and the second wireless network.

6. The apparatus according to claim 2, wherein in a case where one of the key information corresponding to the selected first wireless network and key information corresponding to the second wireless network has not been input on the screen for inputting key information, the authentication unit tries to connect to the wireless network for which the key information was input, and does not try to connect to the wireless network for which the key information was not input.

7. The apparatus according to claim 2, wherein the processor functions as:

a notification unit configured to, in a case where both the key information corresponding to the selected first wireless network and key information corresponding to the second wireless network have been input on the screen for inputting key information, and either the key information corresponding to the selected first wireless network or key information corresponding to the second wireless network is incorrect, notify an error before trying to connect to the wireless networks by using the authentication unit.

8. The apparatus according to claim 1, wherein the processor functions as:

a transition unit configured to perform processing for transitioning from the first wireless network to the second wireless network when connecting to a third wireless network which uses the first frequency band during connection to the first network, wherein in the processing for transition by the transition unit, a result of authentication processing for connecting to the second wireless network by the authentication unit is used.

9. The apparatus according to claim 1, wherein the association unit associates the first wireless network and the second wireless network formed by the same device, based on information on a creator of the wireless network obtained by the search unit.

10. The apparatus according to claim 1, wherein the search unit searches for an access point based on a wireless LAN.

11. A control method of a communication apparatus comprising:

searching for wireless networks which use a first frequency band and wireless networks which use a second frequency band;

associating a first wireless network which uses the first frequency band with a second wireless network which uses the second frequency band, from among the wireless networks found by the search, the first wireless network and the second wireless network being formed by the same device;

selecting, from the wireless networks found by the search, a wireless network to connect to;

performing authentication processing for connecting to the selected wireless network, wherein, in a case where the first wireless network is selected, control is performed so as to perform authentication test processing for connecting to the selected first wireless network and perform authentication test processing for connecting to the second wireless network associated with the first wireless network before connecting to the first wireless network selected in the selecting; and storing authentication information regarding the first and second wireless networks for which the authentication test processing is successful.

12. A non-transitory computer-readable storage medium storing a program for causing a computer to execute a control method of a communication apparatus comprising:

searching for wireless networks which use a first frequency band and wireless networks which use a second frequency band;

associating a first wireless network which uses the first frequency band with a second wireless network which uses the second frequency band, from among the wireless networks found by the search, the first wireless network and the second wireless network being formed by the same device;

selecting, from the wireless networks found by the search, a wireless network to connect to;

performing authentication processing for connecting to the selected wireless network, wherein, in a case where the first wireless network is selected, control is performed so as to perform authentication test processing for connecting to the selected first wireless network and perform authentication test processing for connecting to the second wireless network associated with the first wireless network before connecting to the first wireless network selected in the selecting; and storing authentication information regarding the first and second wireless networks for which the authentication test processing is successful.

* * * * *